United States Patent [19]

Tsoubanos

[11] 3,944,729
[45] Mar. 16, 1976

[54] STABILIZED TERRAIN OPTICAL POSITION SENSOR

[75] Inventor: Christos Tsoubanos, Wanamassa, N.J.

[73] Assignee: The United States of America as represented by the Secretary of the Army, Washington, D.C.

[22] Filed: Mar. 25, 1975

[21] Appl. No.: 561,724

[52] U.S. Cl.... 178/6.8; 178/DIG. 1; 178/DIG. 20; 178/7.88; 178/7.89; 178/7.9; 350/25; 350/26; 244/17.11; 244/17.13
[51] Int. Cl.² .......................................... H04N 7/18
[58] Field of Search......... 178/6.8, DIG. 1, DIG. 20, 178/7.88, 7.89, 7.9; 244/17.11, 17.13; 350/25, 26

Primary Examiner—Robert L. Griffin
Assistant Examiner—Edward L. Coles
Attorney, Agent, or Firm—Nathan Edelberg; Robert P. Gibson

[57] ABSTRACT

A system for providing a display of information to a helicopter pilot permitting the pilot to hover over a fixed land position selected while in flight includes a television monitor upon whose screen the pilot sees the forward scene on the top portion of the screen and the scene beneath the helicopter on the bottom portion of the screen. The bottom portion of the monitor screen is provided with symbols whose position or length varies and which represent altitude, ascent or descent velocity, rate and direction of movement, acceleration and the position of the helicopter relative to a selected ground object. The system includes a mirror which may be positioned to reflect the ground into one-half of the viewing angle of the image camera, the mirror being stabilized against pitch and roll by a motor system controlled by a gyroscope system.

3 Claims, 14 Drawing Figures

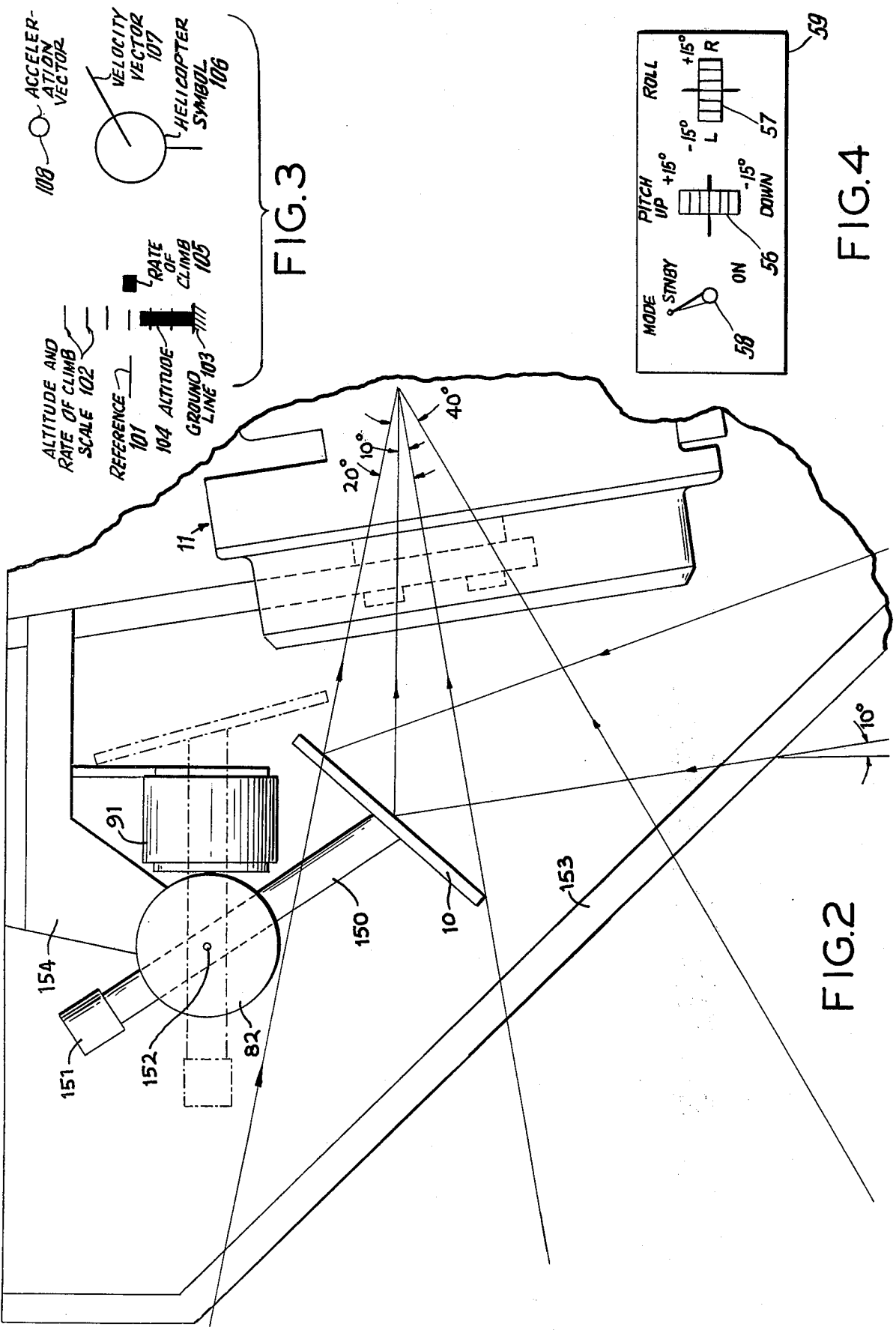

STABILIZED TERRAIN OPTICAL POSITION SENSOR

The invention described herein may be manufactured and used by or for the U.S. Government for governmental purposes without the payment of any royalties thereon or therefor.

BACKGROUND OF THE INVENTION

The present invention relates to information display systems for aircraft guidance and more particularly to such a system for presenting sufficient information to a helicopter pilot to enable him to check the area for obstacles and to hover over a selected ground location.

At the present time a pilot, during the day and if the day is clear, can visually recognize objects on the ground or land features. He may then maneuver his helicopter and hover over a target object or feature by visually aligning his helicopter with other ground features and watching his altimeter. The accuracy of his hovering maneuver depends on his own skill and the availability of visible terrain features. A skilled helicopter pilot can, for example, hover and descend directly over an injured person who is to be evacuated and can maintain a hover position within 15 feet of a selected ground feature.

The presence of fog, smoke or nighttime operation presents an entirely different problem to a pilot who wishes to locate a certain ground position and accurately hover over that position. The problem is less serious if the area is lighted, for example, by flares or spotlights, or if the night is illuminated by bright moonlight or if the helicopter is equipped with a spotlight and the pilot is able to use it. However, there are occasions, particularly in military combat situations, where lights cannot be used without revealing the presence, to the enemy, of the helicopter (in the case of a helicopter spotlight or flare) or the presence of ground personnel (in the case of ground lighting). Such nighttime and hidden operations may be required, for example, to evacuate a pilot shot down behind enemy lines, to supply an isolated outpost in the possible presence of enemy troops, or to attack enemy tanks or other enemy forces under cover of darkness.

It is an objective of the present invention to provide an information display system for use by a helicopter pilot which would enable the pilot to hover his helicopter over any ground position selected by him.

It is an objective of the present invention to provide an information display system for use by a helicopter pilot which will provide sufficient information so that, without excessive training time or unusual pilot skill, he may hover within a few feet of his selected ground object or feature.

It is an objective of the present invention to provide such an information display system for use by a helicopter pilot which will permit him to hover over a target even in the fog or at night without artificial illumination of the target or its area and without the presence of moonlight.

It is an objective of the present invention to provide an information display system for use by a helicopter pilot which will present on a screen simultaneously information about the area forward of the helicopter and information about the area underneath the helicopter; and both sets of information will be in their usual vertical order, with the forward area presented above the ground area, for ready comprehension.

It is an objective of the present invention to provide an information display system for use by a helicopter pilot which will show, using a representative symbol on a screen, the position of the aircraft in relationship to the features or objects on the ground.

It is an objective of the present invention to provide an information display system for use by a helicopter pilot which will show, using representative symbols on a screen, the altitude of the helicopter and the rate (velocity) of its ascent or descent.

It is an objective of the present invention to provide an information display system for use by a helicopter pilot which will show, using representative symbols on a screen, the velocity or movement of the aircraft relative to a selected ground object and its acceleration relative to such object.

It is a feature of the present invention to provide a system for displaying information to a pilot to enable him to hover his helicopter over a selected location. The system includes an image camera, such as a forward-looking infrared sensor or television camera or the like, having an effective viewing angle and mounted on the helicopter so that said viewing angle is substantially forward looking. Hereinafter the term "image camera" will include any device which can generate a picture of an area. A mirror is positionable so that it may be located within the viewing angle to thereby reflect ground information to the camera when the helicopter is hovering. The system also includes means to stabilize the mirror against the pitch and roll of said helicopter, a television monitor mounted within the helicopter, and means to transmit and invert the image from the image camera to the television monitor. Consequently, the image reflected from the stabilized mirror will appear in the bottom portion of the monitor screen.

In one embodiment of the present invention the means to stabilize the mirror includes a gimbal mounting fixed to the helicopter and a bracket fixed to the mirror, a first and a second shaft perpendicular to each other, a first motor and a second motor to respectively position the first shaft and the bracket, two motor control means each to control each of said motors, and a pitch and roll gyroscope connected to provide position signal information to respective ones of said motor control means.

It is a further feature of the present invention to provide, in the system, a pair of position sensing transducers and a pair of electronic amplifiers, those transducers and amplifiers being connected to provide shaft position feedback to the respective motor control means.

It is a further feature of the present invention to provide, on the lower portion of the monitor viewing screen, means to symbolically represent and display the position and rate of direction of movement of the helicopter.

The lower portion of the viewing screen preferably also shows means to symbolically represent and display the acceleration and direction of acceleration of the helicopter and means to symbolically represent and display the altitude and rate of ascent or descent of the helicopter.

BRIEF DESCRIPTION OF THE DRAWINGS

Other objectives and features of the present invention will be apparent from the detailed description which follows and which provides the inventor's best In the drawings:

FIG. 2 is a side plan view of the stabilized mirror of the system shown in FIG. 1;

FIG. 3 is a front plan view of the bottom portion of the television monitor of the system of FIG. 1 showing the electronically generated symbols presented to the helicopter pilot; and FIG. 4 is a front plan view of the pilot's mirror control unit.

DETAILED DESCRIPTION OF THE INVENTION

Figure 1:
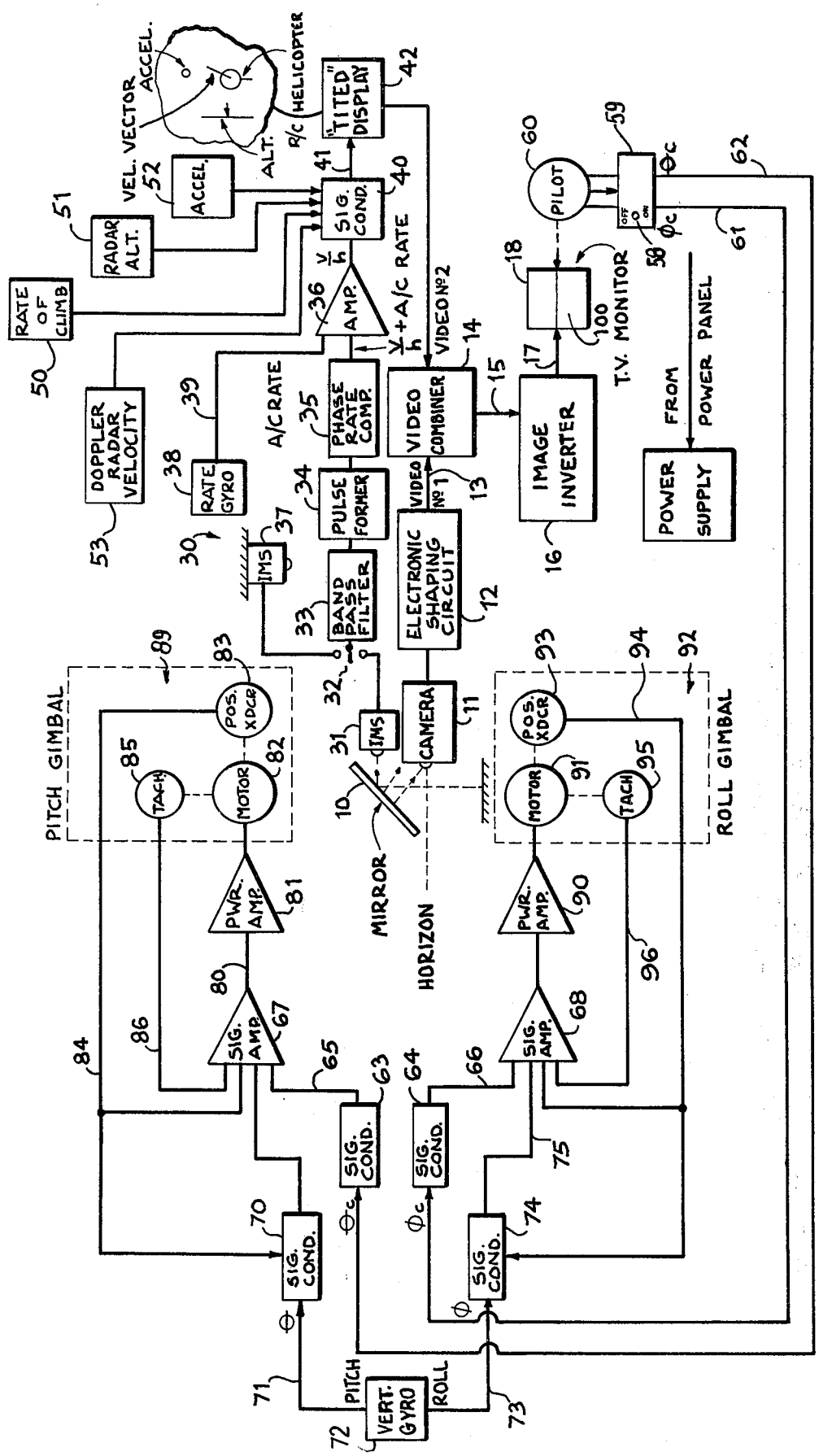
FIG. 1 is a block schematic diagram of the system of the present invention.

As shown in FIG. 1, the entire system is mounted within an aircraft and includes a mirror 10 which is automatically positioned within the viewing angle of the image camera 11 under control of the pilot 60. The image camera 11 may be of various types, for example, may be a forward looking infra-red optical system which converts the infra-red radiation present at night to a visible form. Alternatively, camera 11 may be a low light level television camera which may operate at night by the low level light obtained from starlight or moonlight or the camera 11 may be a normal television camera which operates under daylight conditions or using a search light. The camera 11 is fixedly mounted in the aircraft and the aircraft would generally be a helicopter capable of a hovering operation. The camera 11 is connected to an electronics shaping circuit 12 which, in the case of the forward looking infrared camera, will convert the incoming signals from camera 11 to an output which is in the form of conventional video signals. The video signals from the electronic shaping circuit 12 are transmitted by a video cable 13 to a video combiner 14. The video combiner 14 may be a mixer which combines two different video signals so that they may be both portrayed on the television monitor screen as a superimposed picture. A suitable video combiner is available from Dynair Company of California.

The video signal from the video combiner 14 is transmitted by video cable 15 to the image inverter 16. The image inverter 16 functions to correct the image inversion of the fore-aft downlooking presentation caused by the mirror and to place the image which would otherwise be at the top portion of the television monitor and re-position it to the bottom portion of the television monitor and similarly to re-position the image which would be otherwise at the bottom portion, for example, the bottom 40%, of the television monitor and re-position is so that it is at the top portion of the television monitor. The image inverter 16 is required because the mirror 10 inverts the reflected image and would otherwise place the ground portion of the image at the top of the television monitoring screen. The helicopter pilot, however, is habituated to seeing the ground at the bottom of his view, the horizon next, and the sky area at the top. The image inverter 16 preferably is an electronic system which alters the vertical raster, i.e., the order of the vertical scan. Instead of starting from the top and progressing from the top downward, the vertical scan may start at the bottom, go to the center, and then skip to the top and go from the top to the center. The image inverter 16 will provide, consequently, this conventional type of image on the television monitor 18, to which it is connected by video cable 17.

The television monitor 18 may be a conventional television monitor available from various manufacturers, such as RCA Corporation of New Jersey or Conrac Corporation. In addition to the image of the scene in front of the aircraft (which is produced by the lower 20° of the viewing angle of camera 11) and the image of the scene beneath the aircraft (which is produced by the camera 11 viewing the scene reflected from the mirror 10) the television monitor 18 at the bottom portion of its screen also presents a set of active symbols representing flight information. This set of active electronically generated symbols representing flight information is obtained from instrumentation which would normally be in the aircraft for flying purposes, although, alternatively, additional instruments may be used to provide certain active symbols. By "active symbols" is meant that the visual symbol is produced on the screen by the TV gun and is seen as moving, for example, becomes longer or moves position, in proportion to the element represented by the symbol. Preferably, the information provided by the symbols includes the rate of climb, which may be obtained from the instantaneous vertical speed indicator; the altitude, which may be obtained from an altitude radar; the acceleration in the horizontal direction, which may be obtained from an attitude gyroscope; and the velocity and direction of velocity, which may be obtained, for example, from a doppler velocity radar or from the image motion sensor system 30 shown in FIG. 1.

The image motion system 30 includes a first image motion sensor 31 which is fixed to the aircraft and has a sensing element which is directed at and views the stabilized mirror 10. This image motion sensor 31, as well as the other components of the image motion sensing system, is available from Actron Industries of Monrovia, Cal. The image motion sensor 31 may be stabilized or mounted in a strap-down version, as shown at 37. The switch 32 indicates that when either version of mounting the image motion sensor is used, the sensor is still connected to band-pass filter 33 which in turn is connected to the pulse former 34. The pulse former 34 is connected to a rate comparator 35 which provides an output signal which represents i.e., is directly proportional to, the velocity of the aircraft divided by the height of the aircraft. That output is connected to one of the inputs of differential amplifier 36.

A rate gyroscope 38, fixed to the aircraft, is connected by line 39 as the second input of the differential amplifier 36 and provides the aircraft's rate. When the image motion sensor is used in the strap-down version 37 or fixed to the airframe, the rotational rates of the helicopter must be subtracted from the translational rate by the rate gyroscope 38. The differential amplifier 36 provides its output to the signal conditioner 40. The signal conditioner 40 is connected by line 41 to the "TITED" display 42 described in further detail below, which generates the representatives symbols. The other inputs to the signal conditioner 40 are from other aircraft instruments which provide a basis for the symbology to be displayed on the television monitor 18. One of the inputs to the signal conditioner 40 is from the rate of climb instrument 50, providing the rate of ascent or descent. A still further input to signal conditioner 40 is from the radar altimeter 51, providing the aircraft's height. A still further input to signal conditioner 40 is from the accelerometer 52 which alternatively could be an attitude gyroscope. As explained before, a still further input, which is alternative to the image motion sensor system (including the image motion sensors 31 and 37) would be a doppler velocity radar 53 or an inertial system, either of which would provide a signal proportional to the velocity of the aircraft.

As shown in FIG. 1, the pilot 60 watches the television monitor 18 and guides the aircraft in accordance with the symbols and scenes presented to him on the television monitor 18. As shown in FIG. 4, the pilot 60 is provided with bias controls 56, 57 on the pilot mirror control unit 59 which provide electrical signals to change the direction or angle of the mirror and gives the pilot 60 the ability to look at different areas below or in front of the helicopter. The pilot mirror control unit 59 also has an on-off switch 58 which selects the mode of the mirror 10 either for a down-looking presentation or a stored mirror position with only a forward-looking presentation. The signals representing the movement of the controls are sent over the lines 61 and 62 to the signal conditioners 63 and 64. The signal conditioners are connected by respective lines 65 and 66, as one of the inpts to their respective signal amplifiers 67 and 68. A second input to the signal amplifier 67 is from the signal conditioning circuit 70, which conditioning circuit 70 is connected by line 71 to the vertical gyroscope 72.

The vertical gyroscope 72 provides an electrical signal representing pitch on line 71 to the signal conditioning circuit 70. The vertical gyroscope 72 provides electrical signals representative of both pitch and roll and is a normal instrument found within the aircraft and is normally used in connection with the attitude instruments. Alternatively, other aircraft may have inertial platforms, utilized for navigational purposes, which inertial platforms outputs provide signals representative of the pitch and roll of the aircraft. Those pitch and roll signals may be used alternative to those described in connection with the vertical gyroscope 72. The roll signal from the vertical gyroscope 72 is provided on line 73 to the signal conditioner 74 which in turn is connected by line 75 to the signal amplifier 68.

The signal amplifier 67 is connected by line 80 to a power amplifier 81 which is the control for the motor 82. Motor 82 is a precise positioning motor whose output shaft is fixed to, or otherwise controls, the pitch gimbal to which mirror 10 is directly, or indirectly, fastened. The motor 82 will turn the pitch gimbal 89 so that the mirror 10 is stabilized against pitch, i.e., regardless of the pitch of the aircraft the mirror 10 will remain stable in relationship to the ground. The pitch gimbal is physically connected to a position transducer 83 whose electrical signal output is connected by line 84 to the signal amplifier 67. The motor 82 has its output shaft connected to tachometer 85 whose electrical signal is provied over line 86 as an input to the signal amplifier 67.

A similar system exists for the control of the roll gimbal. It comprises the signal amplifier 68 whose output controls the power amplifier 90 which in turn is the control for the precision position motor 91. The roll gimbal 92 also contains a position transducer 93 whose electrical signal output is transmitted by line 94 to the signal conditioner 74 and to the signal amplifier 68. The roll gimbal 92 also contains a tachometer 95 whose signal output on line 96 is to the input of the signal amplifier 68. The position transducers 93 and 83 may be precision feedback potentiometers which provide an electrical signal in accordance with the exact physical position of their respective motor shafts.

As shown in FIG. 2, the mirror 10 is stabilized in reference to the ground and preferably will be compensated for ±15° of either pitch or roll, or both pitch and roll, about the hover position. The mirror 10 is shown, in full lines, in 20° (one-half) of the viewing angle of the camera 11 and may be withdrawn, to the dashed line position, when not being used. The mirror is behind window 153, which may be a germanium window in the case of a night sensor camera 11. The mirror 10 is fixed, at its rear surface, to bracket 150 whose opposite end supports a counter-weight 151. The bracket 150 is pivoted on support shaft 152. The pitch motor 82 is fixedly mounted on the bracket 150 so that its support shaft 152 (output shaft of motor 82) will turn the bracket, i.e., the motor 82 turns relative to its support shaft 152 which shaft does not rotate about its axis. The roll motor 91 is fixed to the gimbal support 154 and the output shaft of the roll motor is perpendicular to, and fixed to, the support shaft 152. Consequently, the turning of the roll motor shaft will turn the support shaft 152 in a direction about perpendicular to its axis.

The "TITED" (Tactical Avionics Systems Simulation Integrated Trajectory Error Display) display provides electrical control signals for the gun of the TV monitor 18 so that symbols representing altitude, rate of ascent or descent, helicopter position, helicopter velocity and helicopter acceleration are shown in the bottom portion of the screen TV monitor 18.

The general type of digital electronic system for generating the displays is described in Technical Report ECOM-4094 (OSD-1366) "Attitude Line Generator For Television Displays" by C. J. Capriglione and E. A. Karcher, March 1973, and in Technical Report ECOM-4184 (OSD-1366) "Preflight Test Simulation of Superimposed Integrated Trajector Error Displays," by C. Tsoubanos and R. Covington, January 1974. In general a continuous line is generated, representing helicopter velocity and direction. The direction of the line indicates aircraft direction and its length indicates velocity.

As shown in FIG. 3 the bottom portion 100 of the screen of the TV monitor 18 has a set of horizontal fixed marks which are the altitude and rate of climb scale 102 including a reference mark 101. Preferably the bottom portion is about 40% of the screen. A vertical thick line 104 becomes higher or lower and is the line representing altitude relative to ground line 103. A rectangular shaped symbol 105 moves up and down next to marks 102 and represents rate of climb.

A circle 106 which is fixed represents the helicopter and a line 107, starting from circle 106, represents velocity, the length of line 107 being proportional to velocity, i.e., horizontal movement of the helicopter relative to ground. A small circle 108 represents acceleration and its movement, around the center of the circle 106, represents direction of acceleration.

These electronically derived symbols permit a pilot to maintain a hovering position within 5 feet of the selected location (ground reference) for mission completion utilizing the stabilized mirror and system of the present invention. It is realized that the symbols for altitude and altitude rate duplicate information normally obtained from flight instrumentation; however, the presence of those symbols on the TV monitor screen permits the pilot to maintain a hover position by only watching the screen, minimizing loss of time in scanning the instruments.

Alternatively, and less preferred, additional electronically derived symbols may be presented. For example, the bottom portion of the screen may also display such symbols representing torque, an artificial horizon and a zero pitch reference and airspeed.

FIG. 2 is a drawing showing in greater detail the pitch gimbal 96 and the roll gimbal 92 and their relationship to the mirror 10. Preferably the mirror 10 may be removed from in front of a camera 11, for example, by a separate solenoid operated retracting mechanism. This will enable the camera 11 to be a full field of forward vision, for example, a full 40° over forward vision when the pilot wishes to see forward and does not wish to see the ground. Alternatively, when the pilot wishes to see both the ground and forward at the same time, he operates a control button which swings the mirror mechanism into position in front of one-half of the viewing angle of the camera 11. The mirror 10 is shown in FIG. 2 in heavy lines in its position in front of 20° of the viewing angle of camera 11 and is shown in its withdrawn position in dash lines.

What is claimed is:

1. A system for displaying information to enable a helicopter to hover over a selected location, said system including an image camera having an effective viewing angle and mounted on said helicopter so that said viewing angle is substantially forward looking;
   a mirror positionable within said viewing angle to reflect ground information to said camera when the helicopter is hovering;
   means to stabilize said mirror against the pitch and roll of said helicopter;
   a television monitor mounted within the helicopter; and
   means to transmit and invert the image from the image camera to the television monitor so that the image reflected from said mirror will appear in the bottom portion of said monitor screen and the images not reflected from said mirror will appear in the top portion of said monitor screen.

2. A system as in claim 1 wherein said image camera is a low light level television camera.

3. A system as in claim 1 wherein said image camera is an infrared night sensor.

4. A system as in claim 1 wherein the means to stabilize the mirror includes a gimbal mounting fixed to said helicopter, a first and a second shaft perpendicular to each other and said first shaft being rotatable in relationship to said gimbal mounting, and a first motor and a second motor to respectively position said mirror relative to said first and second shafts, two motor control means each to control each of said motors, and a pitch and roll gyroscope connected to provide pitch and roll position information signals to respective ones of said motor control means.

5. A system as in claim 4 and further including a pair of shaft position sensing transducers and a pair of electronic amplifiers, one of said transducers and amplifiers connected to provide position feedback to the respective motor control means.

6. A system as in claim 1 and including mirror mounting means which mount said mirror so that, under operator control, it is positioned within said viewing angle or alternatively withdrawn therefrom.

7. A system for displaying information to enable a helicopter to hover over a selected location, said system including an image camera having an effective viewing angle and mounted on said helicopter so that said viewing angle is substantially forward looking;
   a mirror positionable within said viewing angle to reflect ground information to said camera when the helicopter is hovering;
   means to stabilize said mirror against the pitch and roll of said helicopter;
   a television monitor mounted within the helicopter;
   means to transmit and invert the image from the image camera to the television monitor so that the image reflected from said mirror will appear in the bottom portion of said monitor screen and the image not reflected from said mirror will appear in the top portion of said monitor screen; and
   means to symbolically represent and display the position and direction of movement of the helicopter and said bottom portion of said monitor screen.

8. A system as in claim 7 and further including means to symbolically represent and display the acceleration and direction of movement of said helicopter on said bottom portion of said monitor screen.

9. A system as in claim 7 and further including means to symbolically represent and display the altitude and rate of ascent or descent of the helicopter on said bottom portion of said monitor screen.

* * * * *